(12) United States Patent
Ishihara (10) Patent No.: US 11,654,806 B2
(45) Date of Patent: May 23, 2023

(54) VEHICLE SEAT

(71) Applicant: Honda Motor Co., Ltd., Tokyo (JP)

(72) Inventor: Hajime Ishihara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/492,667

(22) Filed: Oct. 3, 2021

(65) Prior Publication Data

US 2022/0144154 A1  May 12, 2022

(30) Foreign Application Priority Data

Nov. 12, 2020  (JP) .............................. JP2020-188460

(51) Int. Cl.
*B60N 2/68* (2006.01)
*B60N 2/64* (2006.01)

(52) U.S. Cl.
CPC ............... *B60N 2/64* (2013.01); *B60N 2/686* (2013.01)

(58) Field of Classification Search
CPC ............. B60N 2/686; B60N 2/64; B60N 2/66
See application file for complete search history.

(56) References Cited

U.S. PATENT DOCUMENTS

| | | | | |
|---|---|---|---|---|
| 9,884,574 B2* | 2/2018 | Mizoi | ..................... | B60N 2/002 |
| 2008/0136237 A1* | 6/2008 | Kayumi | ................. | B60N 2/914 |
| | | | | 297/284.9 |
| 2011/0241403 A1* | 10/2011 | Yamaguchi | ........ | B60N 2/42709 |
| | | | | 297/452.31 |
| 2017/0088029 A1* | 3/2017 | Mizoi | ..................... | B60N 2/665 |
| 2019/0329676 A1* | 10/2019 | Frye | ........................ | B60N 2/643 |

FOREIGN PATENT DOCUMENTS

| | | | | |
|---|---|---|---|---|
| DE | 102010036481 A1 | * | 6/2011 | ............... B60N 2/66 |
| DE | 102018112643 B3 | * | 8/2019 | ............... B60N 2/42 |
| DE | 102019123684 A1 | * | 3/2021 | ........... B60N 2/0232 |
| EP | 3822167 A1 | * | 5/2021 | ........... B60N 2/0232 |
| JP | 2013193568 | | 9/2013 | |
| JP | 2015096383 | | 5/2015 | |
| JP | 2016088255 | | 5/2016 | |
| JP | 2019025982 | | 2/2019 | |

OTHER PUBLICATIONS

Office Action of Japan Counterpart Application, with English translation thereof, dated Aug. 2, 2022, pp. 1-6.

* cited by examiner

*Primary Examiner* — Timothy J Brindley
(74) *Attorney, Agent, or Firm* — JCIPRNET (57) ABSTRACT

A cushion support member 41 includes: a lower region 42 whose left-right full width is less than an interval between a pair of side frames 14 of a seat back frame 12; an upper region 45 located above the lower region 42 and having a left-right full width greater than the lower region 42. the upper region 45 is divided into a central region 46 including a central part in the left-right direction and provided with a predetermined left-right width, and outer regions 47 provided on outer sides with respect to the central region 46 in the left-right direction, and the central region 46 is arranged as a retracted region which is cut off to leave the outer regions 47 or is recessed to a side opposite to a cushion member with respect to the outer regions 47.

8 Claims, 4 Drawing Sheets

VEHICLE SEAT

CROSS-REFERENCE TO RELATED APPLICATION

This application claims the priority benefit of Japan application serial no. 2020-188460, filed on Nov. 12, 2020. The entirety of the above-mentioned patent application is hereby incorporated by reference herein and made a part of this specification.

BACKGROUND

Technical Field

The disclosure relates to a vehicle seat.

Description of Related Art

Conventionally, for an automobile seat, a structure including a support net for elastically receiving the occupant's backrest load on the seat back is known (see Patent Document 1, for example).

PRIOR ART DOCUMENT

Patent Documents

[Patent Document 1] Japanese Laid-open No. 2019-25982
In the conventional art, a load is hardly applied locally to the periphery of the spine, etc., and the feeling of awkwardness on the back of the occupant can be suppressed. However, while the elastic support net is provided to widely cover the seat back frame, the issue of a heavy weight arises because the support net covers also a region where the occupant does not need to apply a backrest load.

SUMMARY

According to an aspect of the disclosure, a vehicle seat includes a seat back supporting a back of an occupant. The seat back includes: a cushion member forming a backrest surface; a seat back frame, as a frame supporting the cushion member and having a pair of side frames extending in a top-down direction on two sides of the seat back in a left-right direction; and a cushion support member, held in the seat back frame between the pair of side frames to support the cushion member. The cushion support member includes a lower region whose left-right full width is less than an interval between the pair of side frames and an upper region whose left-right full width is greater than the lower region. The upper region is divided into a central region including a central part in the left-right direction and provided with a predetermined left-right width, and outer regions provided on outer sides with respect to the central region in the left-right direction. The central region is arranged as a retracted region which is cut off to leave the outer regions or recessed toward a side opposite to the cushion member with respect to the outer regions.

According to an embodiment of the disclosure, the retracted region is arranged as a notch part open to an upper side and located at an upper end of the cushion support member.

According to an embodiment of the disclosure, the outer regions include a pair of extension parts extending toward outer sides with respect to the lower region in the left-right direction, each of the pair of extension parts is divided into a plurality of partial regions, and in a portion of the partial regions, a reinforcement structure for increasing rigidity over rest of the partial regions is provided.

According to an embodiment of the disclosure, each of the pair of extension parts is divided into an upper stage region and a lower stage region, and the reinforcement structure for increasing the rigidity over the upper stage region is provided in the lower stage region.

According to an embodiment of the disclosure, the pair of extension parts are bent or curved, so that front surfaces on a side of the cushion member are directed toward inner sides in the left-right direction with respect to a residual portion of the upper region excluding the central region.

DESCRIPTION OF THE EMBODIMENTS

Therefore, the disclosure provides a vehicle seat capable of suppressing the feeling of awkwardness on the back when the occupant is seated while reducing the weight.

According to an aspect of the disclosure, a vehicle seat includes a seat back (e.g., the seat back 11 of the embodiment) supporting a back of an occupant. The seat back includes: a cushion member (e.g., the cushion member 21) forming a backrest surface (e.g., the backrest surface 22 of the embodiment); a seat back frame (e.g., the seat back frame 12 of the embodiment), as a frame supporting the cushion member and having a pair of side frames (e.g., the side frames 14 of the embodiment) extending in a top-down direction on two sides of the seat back in a left-right direction; and a cushion support member (e.g., the cushion support member 41 of the embodiment), held in the seat back frame between the pair of side frames to support the cushion member. The cushion support member includes a lower region (e.g., the lower region 42 of the embodiment) whose left-right full width is less than an interval between the pair of side frames and an upper region (e.g., the upper region 45 of the embodiment) whose left-right full width is greater than the lower region. The upper region is divided into a central region (e.g., the central region 46 of the embodiment) including a central part in the left-right direction and provided with a predetermined left-right width, and outer regions (e.g., the outer regions 47 of the embodiment) provided on outer sides with respect to the central region in the left-right direction. The central region is arranged as a retracted region (e.g., the retracted region 46b of the embodiment) which is cut off to leave the outer regions or recessed toward a side opposite to the cushion member with respect to the outer regions.

According to the configuration, since the upper region of the cushion support member is set to be wider than the lower region, with the portions extending outward with respect to the lower region and located on the left and right sides of the upper region, the peripheries of the shoulders of the occupant or the two sides of the upper part of the cushion member are well-supported. Since the lower region of the cushion support member does not support the peripheries of the shoulders, the left-right full width can be narrow. Accordingly, the weight of the seat back can be reduced with the cushion support member. By providing a notch or a recess in the left-right central part of the upper region of the cushion support member, the spine of the occupant hardly receives a support load from the support member, and a feeling of local awkwardness (a feeling of oppression) can be suppressed.

According to an embodiment of the disclosure, the retracted region is arranged as a notch part (e.g., the notch part 46*a* of the embodiment) open to an upper side and located at an upper end of the cushion support member.

According to the configuration, by making the upper region of the cushion support member notch-shaped, the spine of the occupant hardly receives a support load from the cushion support member. Also, compared with the case where the retracted region is configured as curve-shaped, the weight of the cushion support member can be further reduced. In addition, by making the upper side of the cushion support member flexible, at the time when the occupant performs an action such as leaning deeply on the back seat, the cushion support member can follow the action and deform easily.

According to an embodiment of the disclosure, the outer regions include a pair of extension parts (e.g., the extension parts 48 of the embodiment) extending toward outer sides with respect to the lower region in the left-right direction, each of the pair of extension parts is divided into a plurality of partial regions (e.g., the partial regions 48*a* of the embodiment), and in a portion of the partial regions, a reinforcement structure (e.g., the reinforcement structure 51 of the embodiment) for increasing rigidity over rest of the partial regions is provided.

According to the configuration, by providing the reinforcement structure for increasing the rigidity of some of the partial regions in the extension parts over other regions, the rigidity and the flexibility of the portion supporting the upper body (particularly the peripheries of the shoulders) of the occupant can be set properly. Accordingly, the support rigidity to the upper body of the occupant can be ensured, whereas the feeling of local awkwardness on the back or the feeling of discomfort such as the peripheries of the shoulders being pushed forward can be reduced.

According to an embodiment of the disclosure, each of the pair of extension parts is divided into an upper stage region (e.g., the upper stage region 49*a* of the embodiment) and a lower stage region (e.g., the lower stage region 49*b* of the embodiment), and the reinforcement structure for increasing the rigidity over the upper stage region is provided in the lower stage region.

According to the configuration, since only the lower stage region of the extension part has the reinforcement structure, the support rigidity of the lower stage region, which is susceptible to a body load such as in the case where the occupant leans lightly on the backrest, can be increased. Meanwhile, the upper stage region receiving the body load in the case where the occupant leans deeply on the backrest, etc., can possess flexibility. Therefore, the support rigidity for the upper body of the occupant can be maintained, while the feeling of local awkwardness or the feeling of discomfort such as the shoulders being pushed forward can be reduced.

According to an embodiment of the disclosure, the pair of extension parts are bent or curved, so that front surfaces on a side of the cushion member are directed toward inner sides in the left-right direction with respect to a residual portion (e.g., the remaining part 47*a* of the embodiment) of the upper region excluding the central region.

According to the configuration, the pair of extension parts are provided so that the front surfaces on the side of the cushion member are directed toward the inner sides in the left-right direction with respect to the portion on the inner side of the left-right direction. Therefore, the upper cushion member of the cushion support member forms an encompassing shape in the left-right direction (seat width direction). Accordingly, the support force for the upper body of the occupant (particularly the peripheries of the shoulders) is increased, and the posture stability of the occupant can be increased.

According to the disclosure, a vehicle seat capable of suppressing the feeling of awkwardness on the back when the occupant is seated while reducing the weight can be provided.

In the following, an embodiment of the disclosure will be described with reference to the drawings.

<Automobile Seat>

Figure 1:
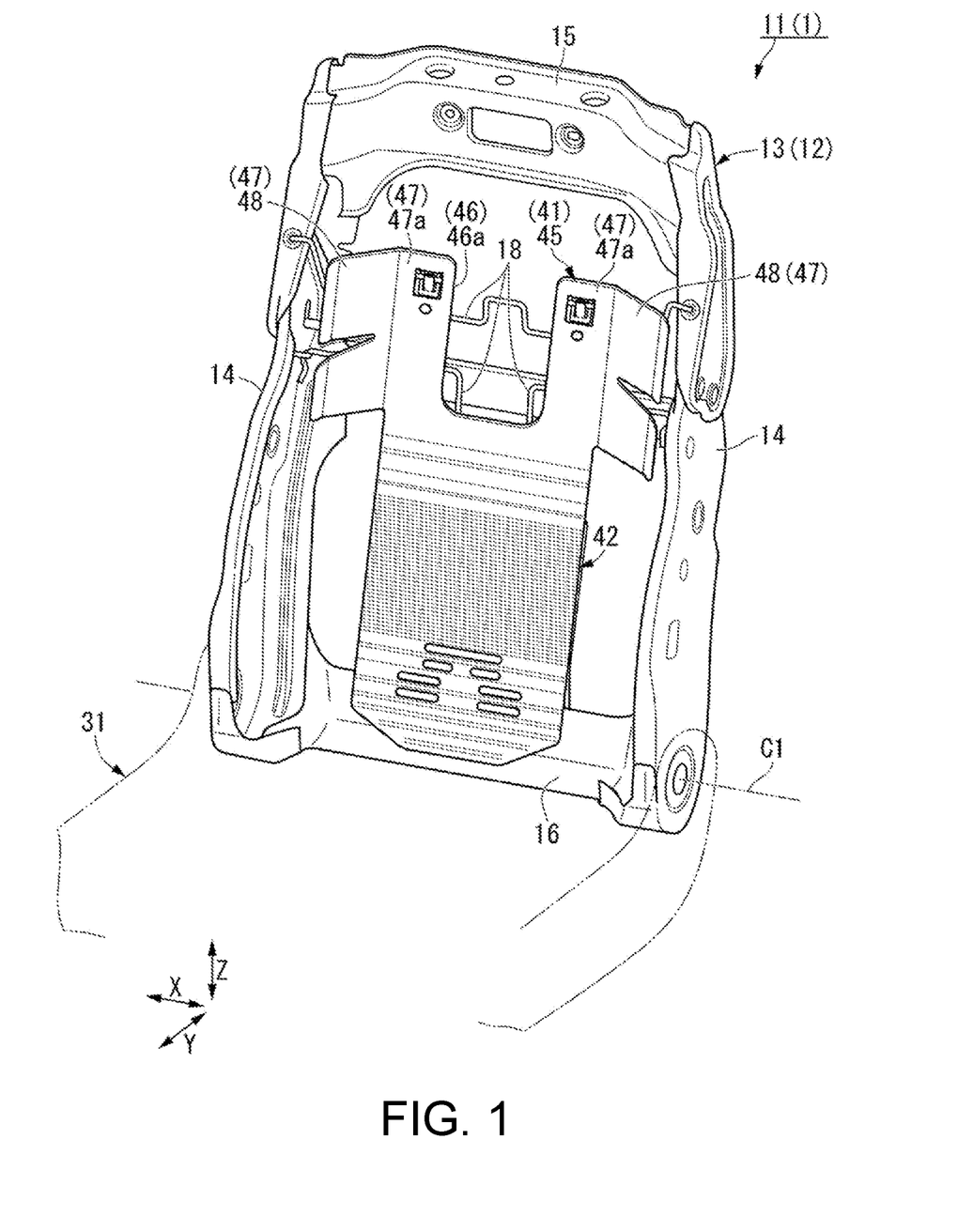
FIG. 1 is a perspective view illustrating a structure of a seat back of an automobile seat according to an embodiment of the disclosure.

FIG. 1 shows a seat back 11 of an automobile seat 1 according to an embodiment. The automobile seat 1 includes a seat cushion 31 where the occupant is seated, a seat back 11 supporting the back of the occupant, and a head rest (not shown) supported by the upper portion of the seat back 11 and supporting the head of the occupant. In the drawings, an arrow X illustrates the left-right direction when the automobile seat 1 is mounted in an automobile, an arrow Y illustrates the front-rear direction at this time, and an arrow Z illustrates the top-down direction at this time.

The automobile seat 1 according to the embodiment is suitable to be adopted for a self-driving automobile. Self-driving means, for example, that at least one of acceleration/deceleration and steering of an automobile is automatically controlled to cause an automobile to travel.

The seat back 11 includes a seat back frame 12 made of metal, which is a skeleton member.

Figure 4:
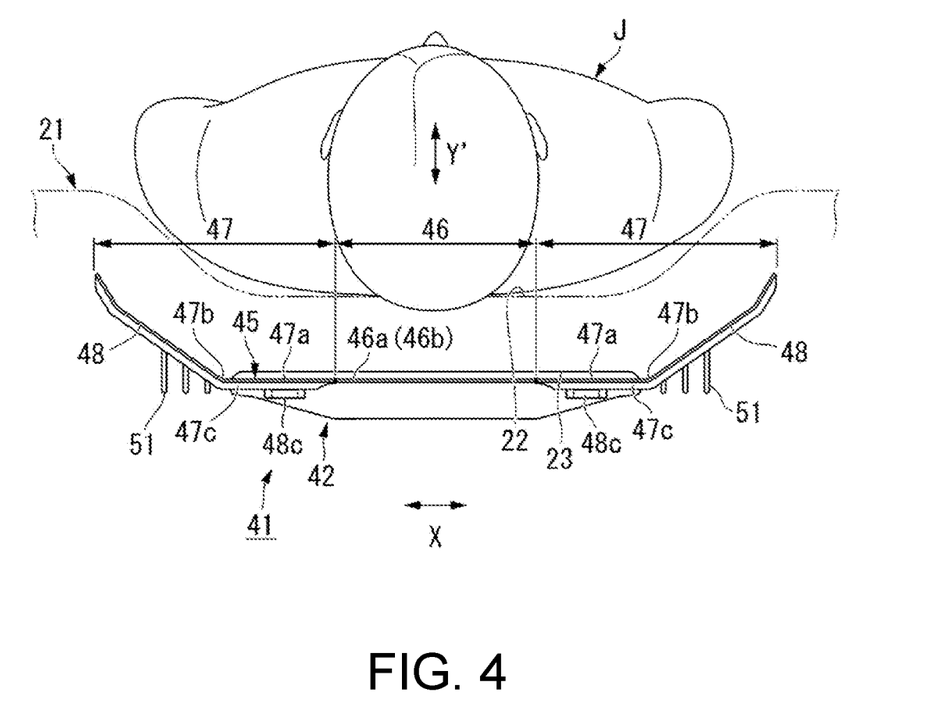
FIG. 4 is a top view of the lumbar mat, where the cushion member and an occupant are also shown.

Referring to also FIG. 4, the seat back 11 includes a cushion member 21 made of urethane foam. The cushion member 21 is supported by the seat back frame 12 and a cushion support member 41 from the rear side. On the front surface of the cushion member 21, a backrest surface 22 supporting the back of an occupant J is formed. The outer surface of the cushion member 21, including the backrest surface 22, is covered by a cover material.

Figure 2:
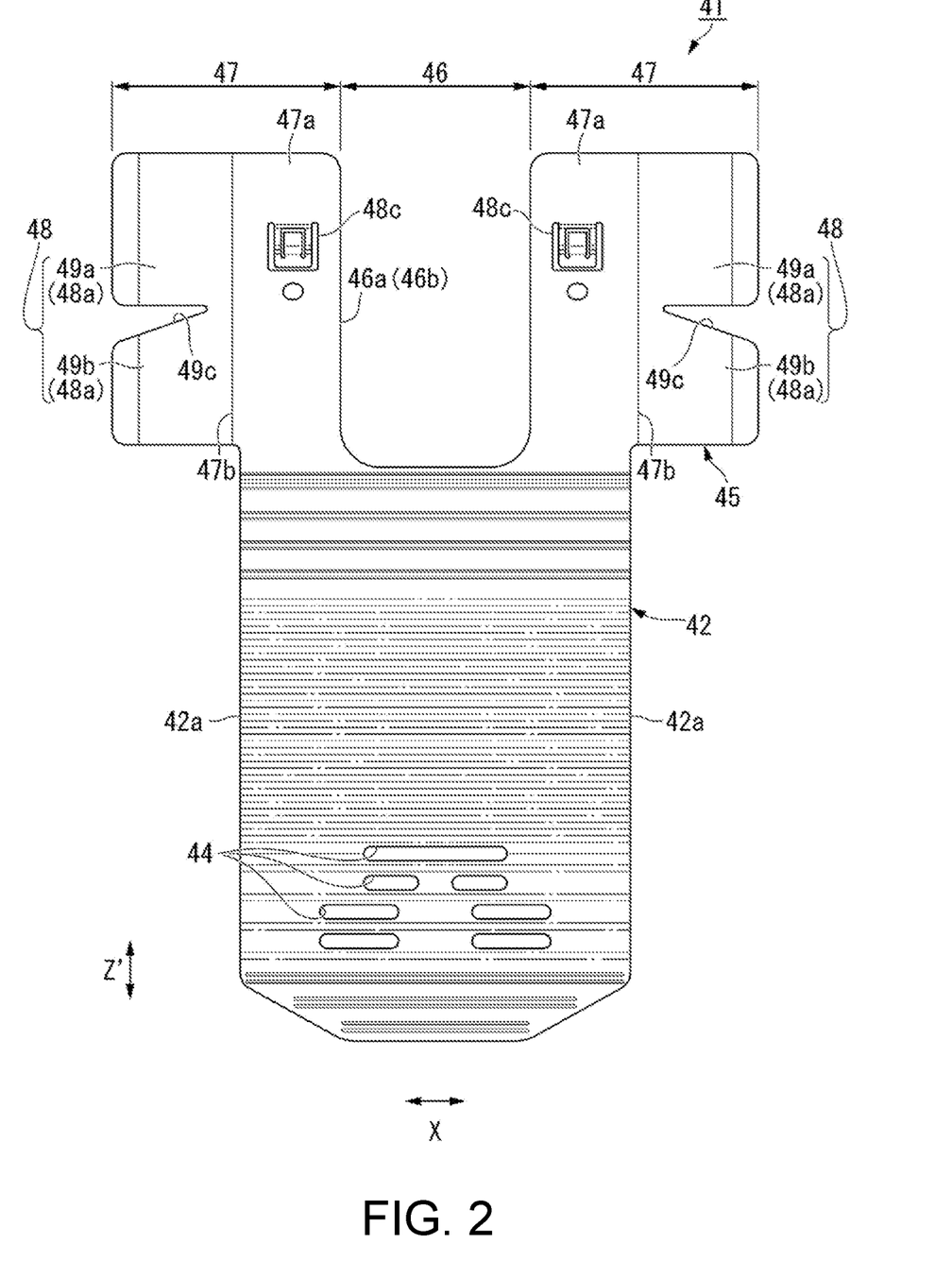
FIG. 2 is a front view of a lumbar mat of the seat back when viewed from a backrest surface side.
Figure 3:
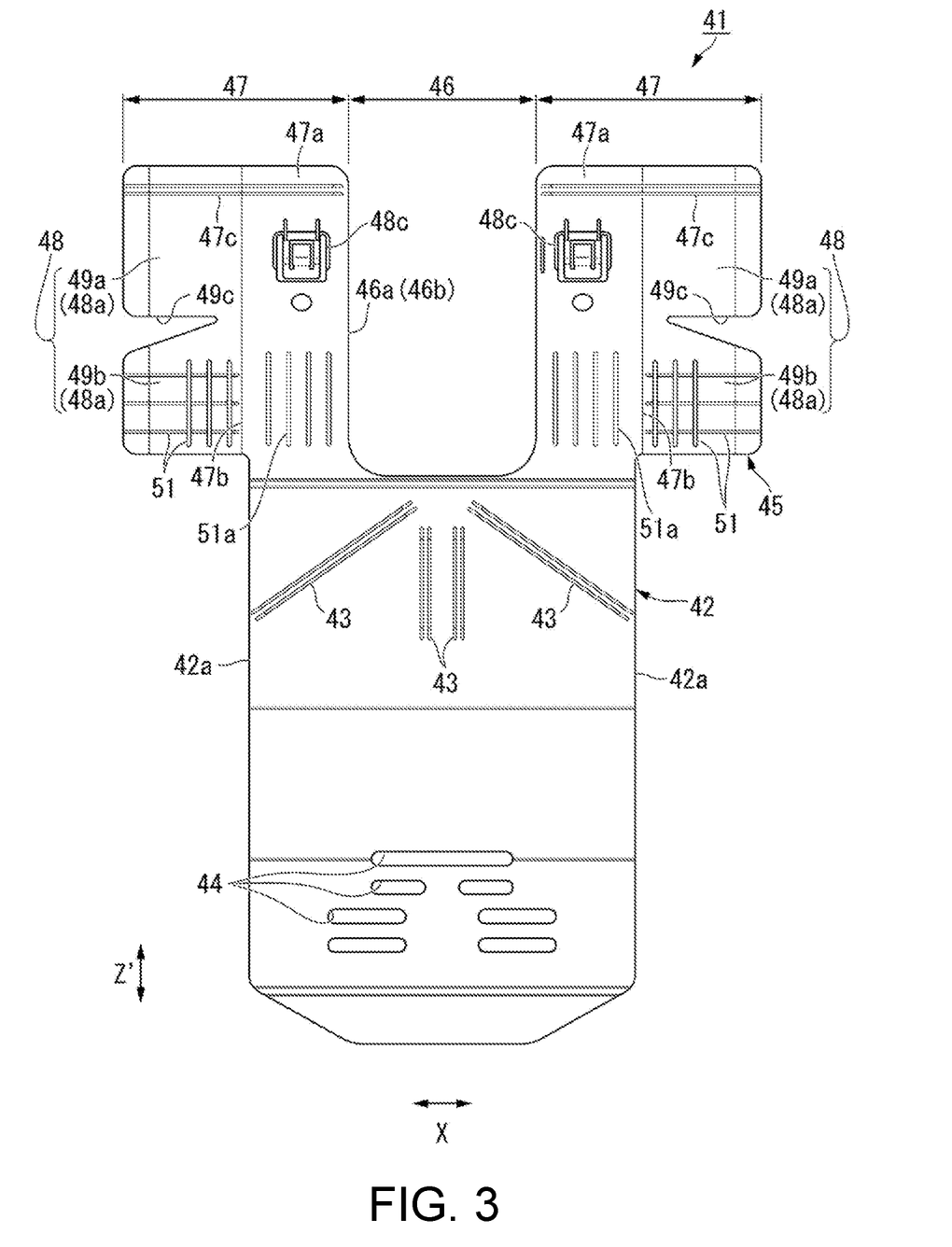
FIG. 3 is a rear view of the lumbar mat when viewed from a side opposite to a cushion member.

For example, the direction of a line connecting the upper and lower ends of the left-right central part of the backrest surface 22 is set as the top-down direction of the seat back 11 (indicated by an arrow Z' in FIGS. 2 and 3). The left-right direction of the seat back 11 is equivalent of the left-right direction of the automobile. The direction orthogonal to the top-down direction and the left-right direction is set as the front-rear direction of the seat back 11 (indicated by an arrow Y' in FIG. 4). The view from the front-rear direction is the front view of the seat back 11.

Referring to FIG. 1, the seat back frame 12 includes a frame part 13 formed along the outer shape of the seat back 11 when viewed in the front view of the seat back 11. The frame part 13 is formed in a substantially rectangular frame shape when viewed in the front view of the seat back 11. The frame part 13 includes a pair of side frames 14 on the left and right extending in the top-down direction of the seat back 11, an upper frame 15 connected between the upper ends of the side frames 14 on the left and right, and a lower frame 16 connected between the lower ends of the left and right side frames 14.

The lower end of the seat back frame 12 is tiltably (reclinably) connected to the rear end of a seat frame (not shown) made of metal, which is the skeleton member of the seat cushion 31, via a rotation axis C1 along the left-right direction (seat width direction).

The seat back frame 12 includes a support wire 18 extending in the left-right direction. The left and right ends of the support wire 18 are respectively connected to the side frames 14 on the left and right. Multiple support wires 18 are provided at an interval in the top-down direction. Each of the support wires 18 is formed by bending a rod-like member made of metal into a predetermined shape. Each of the support wires 18 supports the cushion support member 41. With each of the support wires 18, the cushion support member 41 is attached to the seat back frame 12.

<Cushion Support Member>

On the inner side of the frame part 13 of the seat back frame 12, the cushion support member 41 cooperating with the seat back frame 12 to support the cushion member 21 is provided. Referring to FIGS. 2 to 4, the cushion support member 41 is, for example, provided in a plate-like (mat-like) shape and made of resin. The cushion support member 41 is formed in a mode as a lumbar mat supporting the cushion member 21 in the range from the waist to the shoulder of the occupant. The cushion support member 41 is provided along a back surface (rear surface) 23 of the cushion member 21 on the side opposite to the backrest surface 22. The cushion support member 41 may also be a press-molded product including a steel plate, for example. In the cushion support member 41, the surface on the side of the cushion member 21 may be referred to as the front surface, and the surface on the side opposite to the cushion member 21 may be referred to as the rear surface.

The cushion support member 41 includes a lower region 42 whose left-right full width is less than the interval between the pair of side frames 14 on the left and right, and an upper region 45 connected to the top of the lower region 42 and having a left-right full width greater than the lower region 42. For example, the cushion support member 41 is provided to be laterally symmetric. The cushion support member 41 is not limited to the configuration where the upper region 42 and the lower region 45 are integrally formed, but may also have a configuration where the upper and lower regions 42 and 45 are separate components to each other.

The upper region 45 is divided into a central region 46 provided in a predetermined left-right width and including the central part in the left-right direction and outer regions 47 provided on the outer sides in the left-right direction with respect to the central region 46. The central region 46 of the embodiment is configured as a notch part 46a which is cut off to leave the outer regions 47 on the left and right. The notch part 46a is open to the upper side and located at the upper end of the cushion support member 41. The notch part 46a is an example of a retracted region 46b for suppressing a support load (surface pressure) with respect to the back surface 23 of the cushion member 21. The retracted region 46b may also be a recessed part recessed toward the side opposite to the cushion member 21 with respect to the outer regions 47 on the left and right, for example.

The outer regions 47 on the left and right include a pair of remaining parts 47a remaining on the left and right sides of the notch part 46a in the extension of the lower region 42 toward the top and a pair of extension parts 48 further extending toward the leftward and rightward outer sides on the left and right sides of the remaining parts 47a on the left and right. The remaining parts 47a on the left and right are connected in a flat shape with the lower region 42. The lower region 42 has a shallow uneven shape along the left-right direction, for example. The lower region 42 is generally in a flat shape, compared with the upper region 45 raised by bending the extension parts 48 on the left and right toward the side of the cushion member 21. On the lower side of the lower region 42, in addition to the uneven shape along the left-right direction, for example, multiple rib pairs 43 holding the support wires 18 and multiple openings 44 in a slit-shape along the left-right direction are formed.

The extension parts 48 on the left and right extend toward the outer sides in the left-right direction with respect to the lower region 42, and expand the left-right full width of the upper region 45 to exceed the left-right full width of the lower region 42. The extension parts 48 on the left and right are provided to be located toward the side of the cushion member 21 toward the outer sides in the left-right direction with respect to the remaining parts 47a on the left and right. The extension parts 48 on the left and right are bent to direct the front surface on the side of the cushion member 21 toward the inner sides in the left-right direction with respect to the remaining parts 47a on the left and right. In the embodiment, the extension parts 48 on the left and right are bent to rise toward the side of the cushion member 21 by using bending lines 47b in the extending directions of side edges 42a of the lower region 42 on the left and right as the base points. The bending angles of the extension parts 48 on the left and right are less than 90 degrees, and the angles formed between the extension parts 48 and the remaining parts 47a on the left and right are obtuse angles. Accordingly, the upper region 45 forms a shape gently encompassing the side of the back surface 23 of the cushion member 21 in the left-right direction. The extension parts 48 on the left and right are not limited to the configuration of being bent toward the side of the cushion member 21 in a linear shape when viewed in the top view of FIG. 4, but may also be in a configuration of being curved toward the side of the cushion member 21 in an arc shape when viewed in the top view of FIG. 4.

Each of the extension parts 48 on the left and right is divided into multiple partial regions 48a. In the embodiment, each of the extension parts 48 on the left and right is divided into an upper stage region 49a and a lower stage region 49b. Between the upper and lower regions, a notch part 49c for dividing the upper and lower regions is provided.

In the embodiment, a reinforcement structure 51 for increasing the rigidity over the upper stage region 49a is provided on the back surface (rear surface) on the side opposite to the cushion member 21 in the lower stage region 49b. The reinforcement structure 51 is configured as a lattice-like rib structure, for example.

Referring to FIGS. 3 and 4, reinforcement ribs 47c extending in the left-right direction along the upper edge of the cushion support member 41 are provided on the back surface of the upper end of the cushion support member 41. The reinforcement ribs 47c are provided across the upper stage regions 49a and the remaining parts 47a.

Multiple ribs 51a are provided along the top-down direction on the back surface at portions located on the inner sides with respect to the lower stage regions 49b in the left-right direction in the remaining parts 47a. Clip parts 48c for holding the support wires 18 are provided at portions located on the inner sides in the left-right direction with respect to the upper stage regions 49a in the remaining parts 47a.

While the upper region 45 is provided to extend between the pair of the side frames 14 on the left and right, the left and right ends of the extension parts 48 on the left and right are respectively provided with gaps in the left-right direction with respect to the side frames 14 on the left and right.

Accordingly, the upper region 45 can be suppressed from contacting the side frames 14 on the left and right when being bent. The left and right ends of the upper region 45 may also be respectively brought into contact with or connected with the side frames 14 on the left and right, respectively. The left and right ends of the upper region 45 may be provided with gaps with the side frames 14 on the left and right, respectively, while being overlapped with the side frames 14 on the left and right when viewed in the front view of the seat back 11.

The upper region 45 supports the back surface 23 of the cushion member 21 located in the vicinity of the shoulder blades of the occupant. Accordingly, the damping characteristic of the urethane foam (cushion member 21) in the vicinity of the shoulder blades of the occupant is exerted efficiently, and the urethane foam stably supports the upper body of the occupant. The central region 46 (the notch part 46a) of the upper region 45 is set as the retracted region 46b suppressing the support load (surface pressure) with respect to the back surface 23 of the cushion member 21. Accordingly, the support load from the cushion support member 41 with respect to the vicinity of the spine of the occupant can be suppressed.

When viewed in the front view of the seat back 11, the central region 46 (the notch part 46a) of the upper region 45 is formed in a rectangular shape in which the left-right width is uniform. However, the disclosure is not limited thereto. For example, the notch part 46a may also be formed so that the width in the left-right direction increases from the lower end to the upper end of the upper region 45. Accordingly, at the time when the body (particularly the upper body) of the occupant swings in the left-right direction, the support load from the cushion support member 41 with respect to the vicinity of the spine of the occupant can be suppressed.

That is, in the case where the body (particularly the upper body) of the occupant swings in the left-right direction in an automobile behavior under self-driving, the swing of the spine of the occupant increases toward the upper side. By arranging the notch part 46a to expand toward the upper side, even if the body of the occupant swings leftward and rightward, the increase in the support load received from the cushion support member 41 in the vicinity of the spine of the occupant can be suppressed.

The extension parts 48 on the left and right are closer to the back surface 23 of the cushion member 21 than the remaining parts 47a and the lower region 42, and contact and support the back surface 23 of the cushion member 21 more strongly than the remaining parts 47a and the lower region 42. Accordingly, the support force around the shoulders of the occupant is increased.

The extension parts 48 on the left and right have the reinforcement structures 51 only in the partial regions 48a on the lower side, and the rigidity of the partial regions 48a on the upper side is relatively decreased. Accordingly, on the upper side of the extension parts 48 on the left and right, the support load received by the cushion member 21 from the left and right extension parts 48 is decreased. As a result, it becomes easier for the occupant to perform actions such as leaning deeply on the seat back 11 or twisting the upper body, etc.

On the remaining parts 47a on the left and right, the frame attachment parts (clip parts 48c) for attaching the upper part of the cushion support member 41 to the seat back frame 12 are provided. The frame attachment parts detachably holds and fixes the central parts of the support wires 18 in the length direction. Meanwhile, in the extension parts 48 on the left and right, no the frame attachment part is not provided. In particular, the flexibility of the upper parts of the extension parts 48 on the left and right is maintained.

In the embodiment, the cushion support member 41 is attached to the support wires 18. However, the disclosure is not limited thereto. For example, instead of being attached to a wire-like member, the cushion support member 41 may also be attached to a frame member connecting the side frames 14 on the left and right, attached to a bracing member suitably constructed to an outer frame part of the seat back frame 12, or attached to another resin-made member attached to the seat back frame 12.

As described above, the vehicle seat according to the embodiment is the vehicle seat 1 including the seat back 11 supporting the back of the occupant. The seat back 11 includes: the cushion member 21 forming the backrest surface 22; the seat back frame 12, as a frame supporting the cushion member 21 and having the pair of side frames 14 extending in the top-down direction on two sides of the seat back 11 in the left-right direction; and the cushion support member 41, held in the seat back frame 12 between the pair of side frames 14 to support the cushion member 21. The cushion support member includes the lower region 42 whose left-right full width is less than the interval between the pair of side frames 14 and the upper region 45 which is located above the lower region 42 and has a left-right full width greater than the lower region 42. The upper region 45 is divided into the central region 46 including the central part in the left-right direction and provided with a predetermined left-right width, and the outer regions 47 provided on the outer sides with respect to the central region 46 in the left-right direction. The central region 46 is arranged as a retracted region 46b which is cut off to leave the outer regions 47 or recessed toward a side opposite to the cushion member 21 with respect to the outer regions 47.

According to the configuration, since the upper region 45 of the cushion support member 41 is set to be wider than the lower region 42, with the portions (the extension parts 48) extending outward with respect to the lower region 42 and located on the left and right sides of the upper region 45, the peripheries of the shoulders of the occupant or the two sides of the upper part of the cushion member 21 are well-supported. Since the lower region 42 of the cushion support member 41 does not support the peripheries of the shoulders, the left-right full width can be narrow. Accordingly, the weight of the seat back 11 or the cushion support member 41 can be reduced. By providing a notch or a recess as the retracted region in the left-right central part of the upper region 45 of the cushion support member 41, the spine of the occupant hardly receives a support load from the support member 41, and a feeling of local awkwardness (a feeling of oppression) can be suppressed.

In the automobile seat 1, the retracted region 46b is arranged as the notch part 46a open to the upper side and located at the upper end of the cushion support member 41. According to the configuration, by making the upper region 45 of the cushion support member 41 notch-shaped, the spine of the occupant hardly receives a support load from the cushion support member 41. Also, compared with the case where the retracted region is configured as curve-shaped, the weight of the cushion support member 41 can be further reduced. In addition, by making the upper side of the cushion support member 41 flexible, at the time when the occupant performs an action such as leaning deeply on the back seat 11, the cushion support member 41 can follow the action and deform easily.

In the automobile seat 1, the outer regions 47 include the pair of extension parts 48 extending toward the outer sides with respect to the lower region 42 in the left-right direction. Each of the pair of extension parts 48 is divided into the partial regions 48a. Also, in a portion (the lower stage region 49b) of the partial regions 48a, the reinforcement structure 51 for increasing rigidity over the rest (the upper stage region 49a) of the partial regions 48a is provided.

According to the configuration, by providing the reinforcement structure 51 for increasing the rigidity of some of the partial regions 48a in the extension parts 48 over other regions, the rigidity and the flexibility of the portion supporting the upper body (particularly the peripheries of the shoulders) of the occupant can be set properly. Accordingly, the support rigidity to the upper body of the occupant can be ensured, whereas the feeling of local awkwardness on the back or the feeling of discomfort such as the peripheries of the shoulders being pushed forward can be reduced.

In the automobile seat 1, each of the pair of extension parts 48 is divided into the upper stage region 49a and the lower stage region 49b, and the reinforcement structure 51 for increasing the rigidity over the upper stage region 49a is provided in the lower stage region 49b. According to the configuration, since only the lower stage region 49b of the extension part 48 has the reinforcement structure 51, the support rigidity of the lower stage region 49b, which is susceptible to body load such as in the case where the occupant leans lightly on the seat back 11, can be increased. Meanwhile, the upper stage region 49a receiving the body load in the case where the occupant leans deeply on the seat back 11, etc., can possess flexibility. Therefore, the support rigidity for the upper body of the occupant can be maintained, while the feeling of local awkwardness or the feeling of discomfort such as the shoulders being pushed forward can be reduced.

In the automobile seat 1, the pair of extension parts 48 are provided to be located toward the side of the cushion member 21 toward the outer sides in the left-right direction with respect to the residual portion (the remaining part 47) of the upper region 45 excluding the central region 46.

According to the configuration, the pair of extension parts 48 are provided to be bent or curved toward the side of the cushion member 21 with respect to the remaining parts 47a on the inner sides in the left-right direction. Therefore, the upper portion of the cushion support member 41 forms a shape encompassing the cushion member in the left-right direction (seat width direction). Accordingly, the support force for the upper body of the occupant (particularly the peripheries of the shoulders) is increased, and the posture stability of the occupant can be increased.

It is noted that the disclosure is not limited to the above embodiment. For example, the disclosure is not limitedly applicable to an automobile seat, but may also be applied to the vehicle seats for various transportation equipment such as aircrafts, ships, and construction machinery, etc.

The configuration in the above embodiment is an example of the disclosure, and various modifications can be made without departing from the gist of the disclosure, such as replacing the constituent elements of the embodiment with well-known constituent elements.

What is claimed is:

1. A vehicle seat, comprising a seat back supporting a back of an occupant,
    wherein the seat back comprises: a cushion member forming a backrest surface; a seat back frame, as a frame supporting the cushion member and having a pair of side frames extending in a top-down direction on two sides of the seat back in a left-right direction; and a cushion support member, held in the seat back frame between the pair of side frames to support the cushion member,
    wherein the cushion support member comprises a lower region whose left-right full width is less than an interval between the pair of side frames and an upper region whose left-right full width is greater than the lower region,
    the upper region is divided into a central region comprising a central part in the left-right direction and provided with a predetermined left-right width, and outer regions provided on outer sides with respect to the central region in the left-right direction, and
    the central region is arranged as a retracted region which is cut off to leave the outer regions or recessed toward a side opposite to the cushion member with respect to the outer regions, wherein the retracted region is arranged as a notch part open to an upper side and located at an upper end of the cushion support member, and
    the outer regions comprise a pair of extension parts extending toward outer sides with respect to the lower region in the left-right direction,
    each of the pair of extension parts is divided into a plurality of partial regions, and in a portion of the partial regions, a reinforcement structure for increasing rigidity over rest of the partial regions is provided.

2. The vehicle seat as claimed in claim 1, wherein each of the pair of extension parts is divided into an upper stage region and a lower stage region, and the reinforcement structure for increasing the rigidity over the upper stage region is provided in the lower stage region.

3. The vehicle seat as claimed in claim 1, wherein the pair of extension parts are bent or curved, so that front surfaces on a side of the cushion member are directed toward inner sides in the left-right direction with respect to a residual portion of the upper region excluding the central region.

4. The vehicle seat as claimed in claim 2, wherein the pair of extension parts are bent or curved, so that front surfaces on a side of the cushion member are directed toward inner sides in the left-right direction with respect to a residual portion of the upper region excluding the central region.

5. A vehicle seat, comprising a seat back supporting a back of an occupant,
    wherein the seat back comprises: a cushion member forming a backrest surface; a seat back frame, as a frame supporting the cushion member and having a pair of side frames extending in a top-down direction on two sides of the seat back in a left-right direction; and a cushion support member, held in the seat back frame between the pair of side frames to support the cushion member,
    wherein the cushion support member comprises a lower region whose left-right full width is less than an interval between the pair of side frames and an upper region whose left-right full width is greater than the lower region,
    the upper region is divided into a central region comprising a central part in the left-right direction and provided with a predetermined left-right width, and outer regions provided on outer sides with respect to the central region in the left-right direction, and
    the central region is arranged as a retracted region which is cut off to leave the outer regions or recessed toward a side opposite to the cushion member with respect to the outer regions, wherein the outer regions comprise a pair of extension parts extending toward outer sides with respect to the lower region in the left-right direction, each of the pair of extension parts is divided into a plurality of partial regions, and in a portion of the partial regions, a reinforcement structure for increasing rigidity over rest of the partial regions is provided.

6. The vehicle seat as claimed in claim 5, wherein each of the pair of extension parts is divided into an upper stage region and a lower stage region, and the reinforcement structure for increasing the rigidity over the upper stage region is provided in the lower stage region.

7. The vehicle seat as claimed in claim 5, wherein the pair of extension parts are bent or curved, so that front surfaces on a side of the cushion member are directed toward inner sides in the left-right direction with respect to a residual portion of the upper region excluding the central region.

8. The vehicle seat as claimed in claim 6, wherein the pair of extension parts are bent or curved, so that front surfaces on a side of the cushion member are directed toward inner sides in the left-right direction with respect to a residual portion of the upper region excluding the central region.

* * * * *